(12) United States Patent
Bouzigues et al.

(10) Patent No.: US 9,839,052 B2
(45) Date of Patent: Dec. 5, 2017

(54) METHOD FOR ADAPTING A LINK FOR SELECTING A FRAME TRANSMISSION MODE AND CORRESPONDING WI-FI ACCESS POINT

(71) Applicant: Orange, Paris (FR)

(72) Inventors: Marc-Antoine Bouzigues, La Roche sur Yon (FR); Isabelle Siaud, Rennes (FR); Anne-Marie Ulmer-Moll, Rennes (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 14/901,347

(22) PCT Filed: Jun. 30, 2014

(86) PCT No.: PCT/FR2014/051668
§ 371 (c)(1),
(2) Date: Dec. 28, 2015

(87) PCT Pub. No.: WO2014/207412
PCT Pub. Date: Dec. 31, 2014

(65) Prior Publication Data
US 2016/0157269 A1   Jun. 2, 2016

(30) Foreign Application Priority Data
Jun. 28, 2013   (FR) ..................... 13 56340

(51) Int. Cl.
*H04W 4/00* (2009.01)
*H04J 3/08* (2006.01)
(Continued)

(52) U.S. Cl.
CPC ....... *H04W 74/0833* (2013.01); *H04L 1/0001* (2013.01); *H04W 28/0205* (2013.01)

(58) Field of Classification Search
CPC ................................. H04W 74/0833
See application file for complete search history.

(56) References Cited

U.S. PATENT DOCUMENTS

2012/0063389 A1*  3/2012  Abedi ............... H04L 45/28
                                                           370/328
2012/0307921 A1   12/2012  Ulmer-Moll et al.
(Continued)

FOREIGN PATENT DOCUMENTS

| WO | 2008088188 A1 | 7/2008 |
| WO | 2009078524 A1 | 6/2009 |
| WO | 2011083238 A1 | 7/2011 |

OTHER PUBLICATIONS

French Search Report and Written Opinion dated Mar. 5, 2014 for corresponding French Application No. 1356340, filed Jun. 28, 2013.
(Continued)

*Primary Examiner* — Gerald Smarth
(74) *Attorney, Agent, or Firm* — David D. Brush; Westman, Champlin & Koehler, P.A.

(57) ABSTRACT

A link adaptation method uses a selection criterion for selecting a transmission mode for transmitting PPDU frames over a channel of a telecommunications system. The system includes an access point and a plurality of stations having various different transmission modes associated with different data rates. Access to the channel being of the random type. The selection makes use of a time occupancy metric γ of the channel.

9 Claims, 4 Drawing Sheets

(51) Int. Cl.
    *H04W 74/08* (2009.01)
    *H04L 1/00* (2006.01)
    *H04W 28/02* (2009.01)

(56) References Cited

U.S. PATENT DOCUMENTS

2013/0008715 A1* 1/2013 Arteaga ............... E21B 33/062
                                                    175/5
2014/0148100 A1* 5/2014 Kim .................. H04W 72/0406
                                                    455/41.2
2016/0285608 A1* 9/2016 Kwon ................... H04L 5/0055

OTHER PUBLICATIONS

Frost V. S. et al., "Traffic Modeling for Telecommunications Networks", IEEE Communications Magazine, IEEE Service Center, PIscataway, U.S., vol. 32, No. 3, Mar. 1, 1994 (Mar. 1, 1994), pp. 70-81, XP011417098.
International Search Report and Written Opinion dated Sep. 26, 2014 for corresponding International Application No. PCT/FR2014/051668, filed Jun. 30, 2014.
English translation of the International Written Opinion dated Sep. 26, 2014 for corresponding International Application No. PCT/FR2014/051668, filed Jun. 30, 2014.
Daji Qiao, Sunghyun Choi, Amit Jain, and Kan G. Shin, "MiSer: An Optimal Low-Energy Transmission Strategy for IEEE 802.11a/h," MobiCom'03, pp. 161 175, Sep. 2003.
IEEE Computer Society, "Wireless LAN Medium Access Control (MAC) and Physical Layer (PHY) Specifications," IEEE Std 802.11™ 2012, 2012.
Chapter 16, Section 5, pp. 1068 1077, John G. Proakis and Masoud Salehi, Digital. Communications, 5th ed., publisher McGraw-Hill International, 2008.
V. Erceg et al., "TGn Channel Models," IEEE P802.11 Wireless LANs, 2007.

* cited by examiner

METHOD FOR ADAPTING A LINK FOR SELECTING A FRAME TRANSMISSION MODE AND CORRESPONDING WI-FI ACCESS POINT

CROSS-REFERENCE TO RELATED APPLICATIONS

This Application is a Section 371 National Stage Application of International Application No. PCT/FR2014/051668, filed Jun. 30, 2014, the content of which is incorporated herein by reference in its entirety, and published as WO 2014/207412 A1 on Dec. 31, 2014, not in English.

FIELD OF THE DISCLOSURE

The present invention relates to the field of telecommunications. Within this field, the invention relates to so-called "digital" communication between communication entities. A communication entity may equally well be a mobile terminal or a fixed terminal or an access point to an access network. The invention relates more particularly to techniques for selecting a transmission mode or link, which techniques are sometimes referred to as link adaptation techniques, and they are performed by an access point to an access network in a context of sharing a common channel between different communication entities.

Digital communications include in particular wireless communication; by way of example, they also include wired communication. The communication transmission medium is commonly referred to as the transmission or propagation channel, originally with reference to a channel over the air, and by extension with reference to any channel. By way of example, wired systems may include a power line transmission (PLT) type interface with a wired transmission channel that uses the electricity network, or an optical transmission interface with a transmission channel that may equally well be "wired" (i.e. using optical fiber) or over the air, e.g. as output from a light emitting diode (LED). Wireless systems have a radiofrequency (RF) transmission interface when the telecommunications system involves transmitting over the air a signal that lies in a radio band (e.g. of GSM, UMTS, 802.11x, 802.16e type).

A transmission interface includes the physical layer PHY which covers one or more transmission modes and transmission protocols (medium access control (MAC)) for making use of those transmission modes. In the context of the invention, a transmission mode designates a transmission technique (OFDM, MIMO (spatial mapping, spatial division multiplex, etc.), spread spectrum, etc.) associated with a scheme for error correcting code and for digital modulation, which scheme is referred to as a modulation and coding scheme (MCS) and is typically QPSK 1/2, 16-QAM 3/4, etc.), and associated with a transmission bandwidth Bw and with a transmission carrier frequency (optical, RF, etc. possibly of zero value) enabling the signal to be generated in a spectrum band that is dedicated to transmitting the signal (baseband, radio band, infrared band, optical band) in order to deliver a PHY data rate D.

BACKGROUND OF THE DISCLOSURE

Telecommunications systems are generally structured using an architecture that relies on the open source interconnection (OSI) communication model as standardized by the International Standards Organization (ISO).

The OSI communication model defines management of a data transmission system by using a stack of seven protocol layers: the physical layer (layer 1), the data link layer (layer 2), the network layer (layer 3), the transport layer (layer 4), the session layer (layer 5), the presentation layer (layer 6), and the application layer (layer 7).

The first three layers 1, 2, and 3, referred to as "low" layers, relate to implementing the connection and transporting data. The following four layers, referred to as "high" layers, are responsible for data processing. This organization thus enables the telecommunications system to implement the service associated with the data being processed.

Data link protocols satisfy service requests coming from the network layer and they perform this function by emitting service requests to the physical layer.

Exchanges of signaling between two communication entities separated by a transmission channel are controlled at data link layer level by means of a frame structure, where the frames are said to be MAC frames. MAC frames are encapsulated in a frame structure, referred to as physical frames, by the physical layer PHY prior to being transmitted over the transmission channel. Frames include data frames. The remaining frames are referred to below as control frames.

The data frames under consideration have a generic format as shown in FIG. 1. This format comprises a header, payload data, and a tail field. In this format, each layer encapsulates service data unit (SDU) data coming from the higher layer in one or more protocol data units (PDUs).

Control frames include at least a header.

The exchange of frames between the physical (PHY) and MAC layers of an emitter EM and a receiver RE, is shown by the diagram of FIG. 2. The correspondence between the MAC frames of the two MAC layers is performed via a virtual channel CanalVirt. The physical channel CanalPhy between the PHY layers corresponds to the transmission channel.

The data frame transmitted over the communication channel by the PHY layer is then referred to as the physical layer convergence protocol PDU (PPDU) and the payload data transported by a PPDU is referred to as PSDU. The header of a PPDU contains fields for providing synchronization between the emitter and the receiver, for estimating the transmission channel and containing fields with information needed for receiving the PSDU. The payload data coming from the MAC layer is encapsulated in one or more PPDUs.

The transmission time $t_{tra}$ of a PPDU data frame depends on the transmission mode used and must necessarily be shorter than the access time $t_{acc}$ associated with the access mode. The access time is the time during which the transmission channel is available.

In order to comply with a mean physical data rate constraint $D_{moy}$ generally associated with a quality of service QoS that is guaranteed for a given service, the payload data Payload must be transmitted within a duration $\underline{t}$ that is less than the ratio Payload/$D_{moy}$.

The purpose of link adaptation methods is to ensure a mean data rate $D_{moy}$ for an emitter-receiver distance $\underline{d}$ that takes account of the transmission medium in such a manner as to guarantee a quality of service QoS.

For this purpose, the link adaptation method acts in real time to select a transmission interface and a transmission mode that comply with the constraints of the service ($\underline{d}$, data rate, QoS).

Selection thus seeks to obtain the best transmission mode for guaranteeing a data rate and a QoS at a distance $\underline{d}$.

A link adaptation algorithm referred to as MiSer is known from [1]. During an initialization step, the method, while not in operation, determines quality tables. For this purpose, the MiSer algorithm considers the following six parameters:

R: the instantaneous data rate of the transmission mode selected for a given interface of WiFi type;

$P_T$: the transmission power of the emitter;

l: the size of the data field for transmission corresponding to a PSDU unit;

s: propagation losses between the emitter and the receiver;

SRC: the number of request-to-emit (RTS) transmission attempts that correspond to a request to access the channel; and LRC: the number of attempts at transmitting the PPDU.

During initialization, the method estimates two parameters:

L(R,$P_T$,l,s,SRC,LRC): the number of bits that are transmitted correctly; and

E(R,$P_T$,l,s,SRC,LRC): the energy needed to transmit L.

These two estimates are calculated recursively by considering all possible combinations of the parameters R, $P_T$, l, s, SRC, and LRC. Thereafter, on the basis of the two estimated parameters, the method estimates energy efficiency J:

$$J(R, P_T, l, s, SRC, LRC) = \frac{L(R, P_T, l, s, SRC, LRC)}{E(R, P_T, l, s, SRC, LRC)} \quad (1)$$

For each possible combination (l,s,SRC,LRC), the combination (R,$P_T$) that minimizes J is stored.

While the method is running, i.e. not during initialization, the station seeking to transmit estimates the propagation losses s and recovers the number of RTS transmission attempts (SRC) and the number of PPDU transmission attempts (LRC). As a function of the data quadruplet (l,s, SRC,LRC), the station recovers from the quality tables the combination of parameters (R,$P_T$) to be used in order to maximize the energy efficiency of the transmission. That algorithm thus serves to maximize energy efficiency for transmitting a data load, but it is constraining since it requires RTS/CTS frames to be used and it requires an initialization stage while it is not in operation. These frames increase the consumption of the system since emitting RTS/CTS frames has an energy cost. The initialization stage while not operating is necessary in order to calculate the energy efficiency corresponding to all possible combinations of the parameters (R,$P_T$,l,s,SRC,LRC).

SUMMARY

The invention proposes a technique making it possible to improve the efficiency with which a transmission mode is selected that is suitable for guaranteeing a mean data rate $D_{moy}$ and a quality of service QoS at a range $\underline{d}$ for a communication entity having different transmission modes.

Thus, the invention provides a link adaptation method using a selection criterion for selecting a transmission mode for transmitting PPDU frames to be transmitted over a channel of a telecommunications system having an access point and at least one station possessing different transmission modes associated with different instantaneous bit rates, access to the channel being of the random type, and the selection making use of a time occupancy metric γ of the channel.

The invention also provides a WiFi access point having M transmission modes that are associated with respective different instantaneous data rates, M≥2 for a telecommunications system having a plurality of stations and the access point, access to the transmission channel of the WiFi telecommunications system being of the random type.

Thus, a WiFi access point of the invention comprises:

a determination module for determining the value of a first time occupancy metric $\gamma_{n,m}$ of the channel for a given transmission mode;

a comparator module for comparing the values of the metric $\gamma_{n,m}$ for different modes with a threshold value in order to preselect transmission modes; and a link adaptation module for making a selection in compliance with a determined criterion from among the various preselected modes.

According to the invention, the data rate $D_{moy}$ is the ratio between the quantity of payload information transmitted for transmitting a service for a user at the level of the PHY layer requiring a time window T enabling the service of this user to be transmitted. It may cover a plurality of PPDU data packets incorporating the transmission of headers, tail bits (HARQ), and periods of non-transmission between the PPDUs over the time window T. Over the duration of the window, PPDUs may be transmitted to other users, which means that the size of the window depends on the service to be transmitted for the user and on the time occupancy of the channels for other users.

The selection thus relates to the transmission mode that is the best adapted to guaranteeing a data rate $D_{moy}$ and a QoS for a distance $\underline{d}$ over a time window.

The instantaneous data rate is the PHY data rate corresponding to the number of data bits transmitted per second at the scale of a PSDU for a given mode and interface, and it does not take account of the frame format at the MAC layer level.

The invention lies in the context of random access to a transmission channel that is shared between various communication entities. This type of access is to be found in particular in so-called "WiFi" systems. The communication entities have different transmission modes that may all be associated with the same technology, i.e. with the same transmission interface, or with different technologies, i.e. with a plurality of transmission interfaces. In particular, an entity that is compatible with the 802.11-2012 standard [2] has at least ten different modes defined by selecting a modulation and coding scheme (MCS) associated with the type of MIMO "coding" (SDM or STBC). An instantaneous data rate is associated with each of the modes.

The invention selects a transmission mode by taking account of the time occupancy of the channel. For this purpose, the invention estimates the time occupancy by using the metric γ to evaluate the ratio between the time during which the channel is available and the time required for transmitting a PPDU frame. Unlike prior techniques, the transmission mode is selected not only on the basis of maximizing instantaneous data rate, energy efficiency, or spectrum efficiency, but takes account of the time occupancy of the channel, thus making it possible to guarantee a mean data rate, while ensuring optimum use of the channel. By measuring the traffic on the channel, the invention takes account of the availability of the channel in order to select the mode and the associated data rate.

The invention makes it possible advantageously to fill the "holes" that exist between packets, whenever selection is based solely on a maximum data rate criterion. Specifically, using the metric amounts to performing time spreading in order to fill the "holes".

By taking account of the availability of the channel, the method of the invention makes it possible to eliminate modes that would lead to channel congestion even though those modes would indeed maximize energy efficiency. Such a congestion situation leads to a change in the mode that is selected in order to absorb the congestion. Thus, taking account of only the energy efficiency criterion over a certain duration can lead to sub-optimal operation of the system when congestion occurs leading to a drop in the data rate.

In an implementation, the method eliminates selecting transmission modes that do not satisfy some minimum value for the time occupancy metric $\gamma$ of the channel.

The invention advantageously makes it possible to achieve a compromise between data rate, time availability of the channel, and energy expenditure, unlike previously known techniques.

A selection based on minimizing occupancy of the channel by minimizing the size of the packets by choosing to maximize the data rate is generally done to the detriment of the energy efficiency of the system.

Even though certain prior art techniques can maximize energy efficiency and guarantee a quality of service QoS, they do not take account of the impact of lengthening the duration of packets, which can lead to congestion of the channel. Consequently, those techniques may need to manage retransmissions, thereby giving rise to a drop in the data rate.

Another object of the invention is to provide a telecommunications system having multiple transmission modes adapted to performing the method of the invention.

Thus, a telecommunications system of the invention has a WiFi access point as specified above.

In a particular implementation, the time occupancy of the channel is measured over a determined observation window and makes use of a Poisson distribution model for the arrival rates of the PPDU frames to be transmitted, the variance $\lambda$ of the Poisson distribution corresponding to the mean frequency of arrival of the PPDU frames.

This implementation makes use of the random nature of access to the channel by evaluating a probability of PPDU packets arriving by using a Poisson distribution. The duration of the observation window can be set and it is typically determined by simulations. The variance of the Poisson distribution gives the mean frequency with which PPDU frames arrive over the observation window. The mean duration $t_{acc}$ of the availability of the channel is then determined by the difference between the reciprocal of the mean frequency with which PPDU frames arrive and the mean time duration of a PPDU frame:

$$t_{acc} = \frac{1}{\lambda} - \overline{X}$$

The arrival rate of PPDU frames for transmitting may equally well be modelled using a distribution other than a Poisson distribution, such as a Gaussian distribution, or it may be obtained as a result of measurements.

In an implementation, the metric is expressed in the following form:

$$\gamma = 10 \cdot \log_{10}\left(\frac{t_{acc}}{t_{tra_m}}\right)$$

with $t_{acc}$ being the mean access time to the channel over the observation window, $t_{tra_m}$ being the time needed to transit a PPDU frame using the transmission mode $\underline{m}$, and being expressed in the following form:

$$t_{tra_m} = t_{header} + \frac{\text{Data}}{\text{Datarate}(m)}$$

with Data being the load in bytes of the PSDU for transmitting in the PPDU frame, and Datarate being the instantaneous data rate corresponding to the transmission mode $\underline{m}$ being used.

The PPDU frame has a header of duration $t_{header}$ that depends on the transmission mode $\underline{m}$ used for transmitting the PPDU frame.

In an implementation, the various transmission modes are classified by groups of equivalent instantaneous data rates, and for a group, the method comprises:

a determination step for determining the value of a first metric $\alpha$ for a given transmission mode, which metric measures relative degradation of the communication signal at a given distance $\underline{d}$ as introduced by the transmission medium for a given environment relative to a reference model of the transmission medium, resulting from a multi-path effect and/or an attenuation effect of the transmission medium; and a comparison step for comparing values of the first metric $\alpha$ for different modes for selection with at least one transmission mode per group.

This implementation makes it possible advantageously to select different transmission modes based on criteria that make it possible to minimize emission power while satisfying a data rate constraint.

Classification by means of equivalent data rate groups advantageously makes it possible to perform the determination and comparison steps by means of a method for selecting an interface as described in patent application WO 2011/083238 published on Jul. 14, 2011, since that method is limited to interfaces of equivalent data rate, i.e. lying within a range of about 3%.

The method of WO 2011/083238 performs selection by using a criterion for optimizing the link budget, which criterion takes account of the power ARP(d) radiated at a distance $\underline{d}$, of the power $S_M$ required for the model/interface selected at a data rate D associated with a desired QoS. For that purpose, the method makes use of two metrics $\alpha$ and $\beta$. The method selects a transmission mode in a multimode terminal by optimizing the normalized link budget, thus making it possible to compare systems that operate in different bands (RF, optical, wired) and that present independent ranges of power variations.

The metrics $\alpha$ and $\beta$ evaluate the global relative degradation introduced by the multi-path channel for the transmission device and in the propagation medium.

The metric $\beta$ measures power excess between the available power $P_a(d,fc)$ and the required power $S_M$ for providing communication with a given QoS. That method makes it possible to optimize energy efficiency. The use of the metric $\beta$ makes it possible to verify that the selected mode delivers sufficient power that exceeds the sensitivity threshold of the second entity. The situation in which none of the modes can deliver sufficient power to exceed the threshold, means that the second entity is out of range from the first entity. After the transmission mode has been selected, the method can adjust the power that is radiated as a function of the excess power as measured by the second metric.

In a preferred implementation, the steps of the link adaptation method of the invention are determined by the instructions of a program incorporated in an electronic circuit such as a chip, which itself can be arranged in an electronic device such as a communication entity. The link adaptation method of the invention can equally well be performed when the program is loaded into a calculation member such as a processor or the equivalent of operation that is then controlled by executing the program.

Consequently, the invention also applies to a computer program, in particular a computer program on or in a data medium, that is adapted to perform the invention. The program may use any programming language, and be in the form of source code, object code, or code intermediate between source code and object code, such as in a partially compiled form, or in any other desirable form for implementing a method of the invention.

The data medium may be any device capable of storing the program. For example, the medium may comprise storage means, such as a read only memory (ROM), e.g. a compact disk (CD) ROM, a universal serial bus (USE) stick, or a microelectronic circuit ROM, or indeed magnetic recording means, using a hard disk.

Alternatively, the data medium may be an integrated circuit in which the program is incorporated, the circuit being adapted to execute or to be used in the execution of the method in question.

Furthermore, the program may be converted into a transmissible form such as an electrical or optical signal suitable for being conveyed via an electrical or optical cable, by radio, or by other means. The program of the invention may in particular be downloaded from an Internet type network.

BRIEF DESCRIPTION OF THE DRAWINGS

Other characteristics and advantages of the invention appear from the following description of particular examples made with reference to the accompanying figures given as non-limiting examples.

DETAILED DESCRIPTION OF ILLUSTRATIVE EMBODIMENTS

The invention is described while considering a particular use of a so-called WiFi wireless communication system that has one access point and two stations in communication with the access point. The transmission channel, which has access of random type, is shared between communication entities, i.e. the access point and the stations. It is also considered that only one service is activated by a user and that a station is used by only one user. This is naturally an example that is illustrative and not limiting, and it may be generalized to more than two stations, to more than one service per station, and to more than one user per station, and such generalization of the example that is described lies within the competence of the person skilled in the art, given the following description.

In the example, the access point and the stations are compatible with IEEE standard 802.11_2012. The access point and the stations have various transmission modes, which are associated with various different instantaneous data rates.

The method of the invention is performed by the access point. The purpose of the proposed method is to determine the most efficient way of transmitting data relating to a destination service from the first station while complying with a mean data rate $D_{moy}$ and a QoS for this station, and while taking account of the occupancy of the channel by the data transmitted between the access point and the second station.

Figure 1:
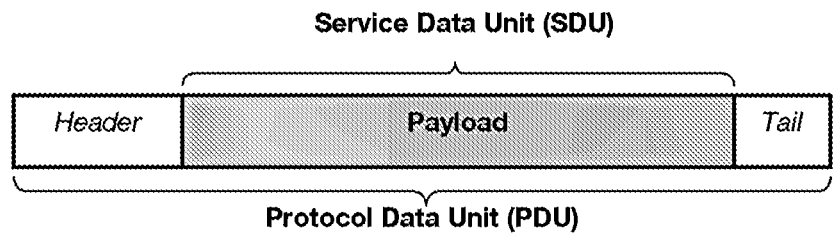
FIG. 1 is a diagrammatic representation of the structure of a frame of the physical layer at level 1 and of the corresponding frame of the MAC layer at level 2, with reference to the OSI model.
Figure 2:
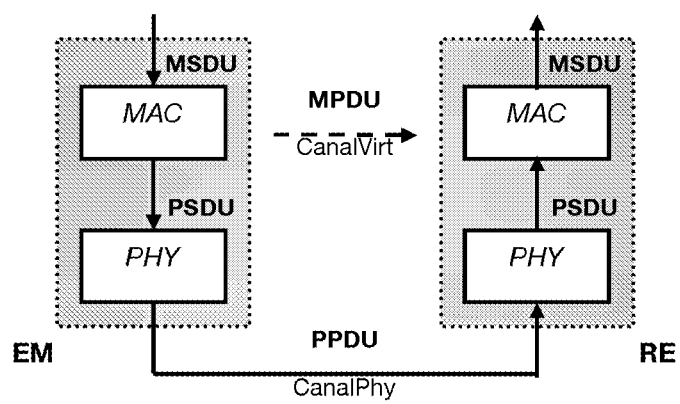
FIG. 2 is a diagram showing the virtual exchange of frames between the physical layers PHY and MAC of an emitter EM and of a receiver RE, and it shows an example of SDU data being encapsulated in the PDUs for the PHY and MAC layers ({PSDU and PPDU}) for the PHY layer, {MSDU,MPDU} for the MAC layer).
Figure 3:
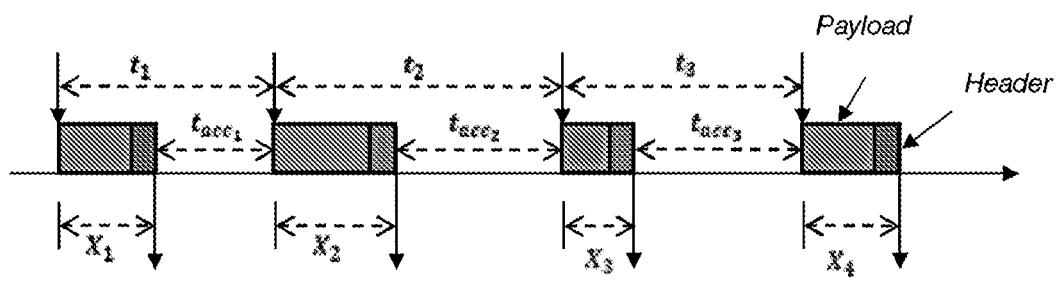
FIG. 3 is a diagram showing the times during which the transmission channel is occupied by frames.

Given the random access to the transmission channel, traffic on the channel as shown in FIG. 3 may be modelled using a Poisson distribution of parameter $\lambda \cdot t_{OBS}$ where $\lambda$ is the arrival frequency of N frames over an observation window $t_{OBS}$ for the WiFi system as a whole:

$$P\{X(t+t_{OBS}) - X(t) = N\} = e^{-\lambda \cdot t_{OBS}} \cdot \frac{(\lambda \cdot t_{OBS})^N}{N!} \quad (2)$$

The invention uses a metric $\gamma$ for evaluating the time occupancy of the transmission channel in order to select the transmission mode and possibly the interface that presents the greatest energy efficiency for transmitting a frame that satisfies the given constraints. The energy efficiency of a transmission mode associated with an interface and a transmission mode is the ratio of the mean data rate to the energy needed for emitting in order to transmit the service, i.e. the required emitting power integrated over a time window T (corresponding to the observation duration for determining the mean data rate) in order to deliver the data rate while complying with the QoS constraint (target binary or packet error rate (BER, PER).

This metric $\gamma$ corresponds to a time spreading coefficient that represents the ratio of the transmission channel availability time over an observation period $t_{OBS}$ to the time needed for transmitting a frame $t_{tra}$. The transmission channel availability time in a random access context is evaluated by the mean access time $t_{acc}$ to the communication channel. The metric $\gamma$ is expressed as follows:

$$\gamma = 10 \cdot \log_{10}\left(\frac{t_{acc}}{t_{tra}}\right) \quad (3)$$

The occupancy of the channel is expressed in the following form:

$$G = \lambda \cdot \overline{X} \quad (4)$$

with:

$$E\{t_n\} = \frac{1}{\lambda} \quad (5)$$

$$E\{X_n\} = \overline{X} \quad (6)$$

where the operator $E\{x\}$ represents the expectation of the variable $\underline{x}$ and $\overline{X}$ is the mean time duration of the PPDU frames transmitted over the channel.

The mean access point $t_{acc}$ of the transmission channel is then given by the following formula:

$$t_{acc} = E\{t_n - X_n\} = \frac{1}{\lambda} - \overline{X} \quad (7)$$

By combining equations (4) and (7), the following is obtained:

$$t_{acc} = \frac{1 - \lambda \overline{X}}{\lambda} = \frac{1 - G}{\lambda} \quad (8)$$

The time $t_{tra}$ needed for transmitting a frame depends on the transmission mode $\underline{m}$ that is used, and is expressed as follows:

$$t_{tra_m} = t_{header} + \frac{Data}{Datarate(m)} \quad (9)$$

with $t_{header}$ being the time duration of the header of the frame, Data being the load in bytes of the PSDU for transmitting in the PPDU frame, Datarate is the instantaneous data rate corresponding to the interface and to the transmission mode $\underline{m}$ in use.

Figure 4:
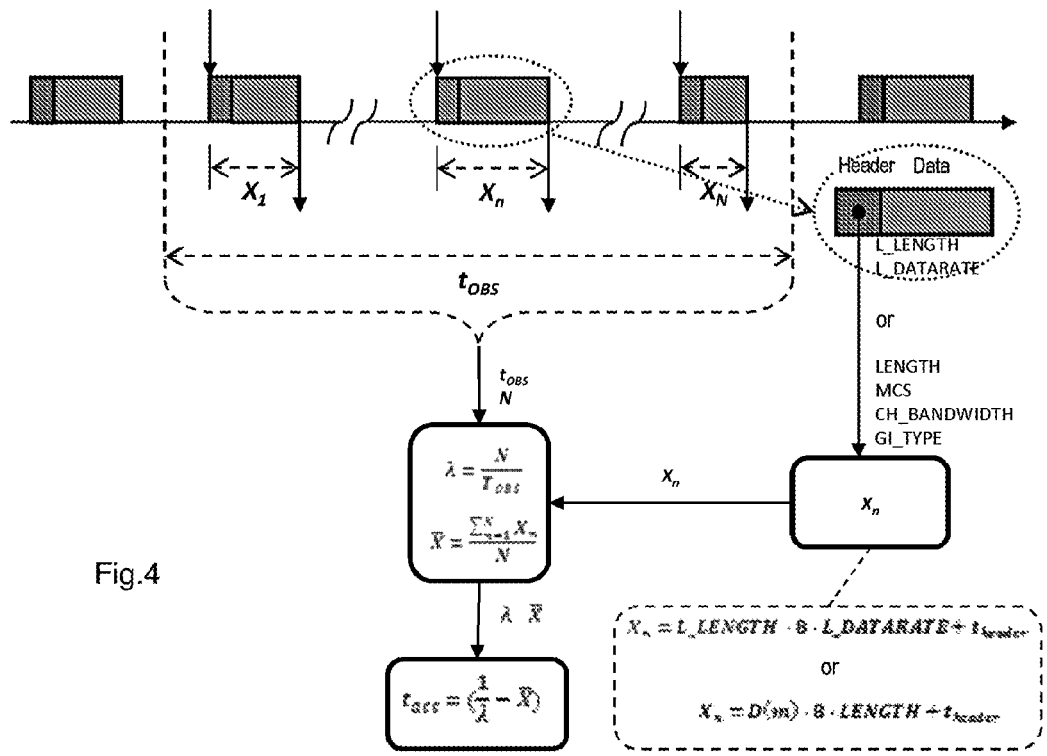
FIG. 4 is a diagram showing how the mean access time $t_{acc}$ to the channel is determined by observing frames transmitted over the channel so as to be able to estimate the parameter $\lambda$, $\overline{X_n}$, and $\overline{X}$, $\lambda$ being the arrival rate of estimated frames at the access point over the time window $t_{obs}$ and $\overline{X}$ being the mean duration of frames over the same observation duration.

With reference to FIG. 4, the parameter $\lambda$ may be estimated by comparing at the access point the number N of frames transmitted over the link during the duration $t_{OBS}$: $\lambda = N/t_{OBS}$.

$\overline{X}$ can be estimated by making use of information contained in the frame headers and more particularly for the PPDU frames: the size of the PSDU and the modulation and coding scheme (MCS) (or the corresponding data rate) in use. Thus, $$\overline{X} = \frac{\sum_{1}^{N} X_n}{N}$$

with $X_n$ being the duration of the $n^{th}$ PPDU frame transmitted during the observation duration, and $\overline{X}$ being the mean size of the N PPDU frames transmitted during the observation duration. The mean access time $t_{acc}$ to the communication channel during the observation duration is then calculated knowing the values of $\lambda$ and of $\overline{X}$.

For example, IEEE standard 802.11_2012 [2] chapter 20.3.2 PPDU formats distinguishes between three types of PPDU: non-HT, HT-mixed, and HT-greenfield. For those three formats, the header is always constituted by the following parameters: a synchronization field STF, a channel estimation field LTF, and an information field containing the signal SIG. In order to know the size of a PPDU, it is necessary to use the information contained in the signal SIG.

For a non-HT PPDU, the field L-SIG (FIG. 20-5 of the standard) contains the data rate (L_DATARATE) corresponding to the MCS used for coding the PSDU and it contains the size of the PSDU in bytes (L_LENGTH). For a (mixed or greenfield) HT PDDU, the fields HT-SIG$_1$ and HT-SIG$_2$ (FIG. 20-6) contain the MCS (MCS), the bandwidth (CH_BANDWIDTH) and the type of guard interval (GI_TYPE) used for transmitting the PSDU, together with its size in bytes (LENGTH). The MCS, the size of the transmission band, and the guard interval make it possible to deduce the equivalent data rate of the PSDU (the data rates are available in Tables 20-30 to 20-40 of the above-mentioned standard). The time duration of the PSDU is obtained by multiplying the data rate by the size of the PSDU.

For example, for a PPDU of HT-mixed type using the mode $\underline{m}$ defined by MCS=15, GI_TYPE=0 (LONG_GI) and CH_BANDWIDTH=1 (HT_CBW40), Table 2035 of the above-mentioned standard, reproduced in Appendix A, gives an instantaneous data rate D(m) of 270.0 megabits per second (Mbps) with a guard interval of 800 nanoseconds (ns). With a length LENGTH=65,535, the size of the PSDU field to be transmitted is 65,535 bytes and its duration is:

$$X_{PSDU} = \frac{65535 \times 8}{270.0e^6} \approx 1.9 \text{ milliseconds (ms)}$$

The maximum size of the HT-mixed header is 64 microseconds (µs), giving the PPDU frame a size $X_m$ of about 2 ms.

Observing the traffic over the channel during $t_{OBS}$ thus enables the access point to determine $\lambda$ and $\overline{X}$ and to deduce therefrom G and also $t_{acc}$ and $t_{tra_m}$ at the instant $\underline{t}$ that corresponds to the end of the observation period.

The new $m_{t'}$ that is to be selected at an instant t' later than the instant $\underline{t}$, t'=t+$\Delta$t, must guarantee the same mean data rate as at instant $\underline{t}$ in order to transmit the service frames $\underline{n}$ that contain on average Data payload bytes and each of which has a time duration $$t_{tra_{m_{t'}}}:$$

$$D_{moy}(t, m_t) = D_{moy}(t', m_{t'}) \quad (10)$$

A mean data rate takes account of the probability of successfully transmitting the service frames n, i.e. transmitting them without collisions, and it can thus be expressed in the following form:

$$D_{moy_n}(t,m_t) = P_S(G(t,m_t)) \cdot \lambda_n(t,m_t) \cdot 8 \cdot \text{Data} \quad (11)$$

Given that the transmission channel is shared between the stations and thus between the services required by the users, and given that it has random access, the occupancy G of the channel as given by equation (4) needs to be weighted. This weighting is necessary in order to take account of collisions in order to estimate the traffic that is really transmitted, i.e. without collision: G is thus designated by the incoming traffic, and the traffic without collision S is said to be the outgoing traffic. The expression for outgoing traffic as a function of G depends on the protocol for accessing the channel in use.

For an ALOHA protocol as described in [3], the outgoing traffic S may be expressed in the form:

$$S = Ge^{-2G} \quad (12)$$

For an ALOHA protocol using time slots, the outgoing traffic S may be expressed in the form:

$$S = Ge^{-G} \quad (13)$$

With an ALOHA protocol, when the incoming traffic is too great (G→∞), the outgoing traffic is zero since all of the packets are subjected to collisions. In contrast, if the incoming traffic is very low (G→0), then nearly all of the packets are correctly transmitted.

CSMA protocols make it possible to increase the fraction of packets that are correctly transmitted compared with the ALOHA protocol.

For the CSMA/CD as described in Chapter 20 of [2], if the frame retransmission delay is long compared with the duration of the frames, and if the frames are considered to arrive independently, it is known that:

$$S = \frac{Ge^{-aG}}{G(1+2a) + e^{-aG}} \quad (14)$$

For CSMA/CA operating with time slots, it is known that:

$$S = \frac{aGe^{-aG}}{1 + a - e^{-aG}} \quad (15)$$

The probability $P_S(G)$ that a packet will be transmitted successfully without collision over the communication channel while the occupancy of the communication channel is G, is expressed in the following form:

$$P_S(G) = \frac{S}{G} \quad (16)$$

Under certain conditions, with a CSMA protocol, the outgoing data rate can be approximated using the following equation:

$$S \approx \frac{G}{1+G} \quad (17)$$

With a CSMA protocol, the probability $P_S(G)$ that a PPDU frame will be transmitted successfully without collision over the channel can then be written:

$$P_S(G) \approx \frac{1}{1+G} \quad (18)$$

By combining equations (18) and (11), the mean data rate can be expressed in the following form:

$$D_{moy_n}(t, m_t) \approx \lambda_n(t, m_t) \cdot \frac{1}{1 + G(t, m_t)} \cdot 8 \cdot Data_n \quad (19)$$

Let G' be the fraction of traffic that is due to services other than the service n:

$$G' = G - \lambda_n \overline{X}_n \quad (20)$$

which corresponds to a frame arrival frequency:

$$\lambda' = \lambda - \lambda_n \quad (21)$$

The mean data rate can then be expressed in the form:

$$D_{moy_n}(t, m_t) \approx \frac{\lambda_n(t, m_t)}{1 + G'(t, m_t) + \lambda_n(t, m_t)\overline{X}_n(t, m_t)} \cdot 8 \cdot Data_n \quad (22)$$

From equation (22), the transmission rate of service frames n can be expressed in the following form:

$$\lambda_n(t, m_t) \approx \frac{1 + G'(t, m_t)}{\frac{8 \cdot Data_n}{D_{moy_n}(t, m_t)} - \overline{X}_n(t, m_t)} \quad (23)$$

This equation (23) makes it possible to evaluate the successful transmission rate of service frames n at instant t'=1+Δt, as follows:

$$\lambda_n(t', m_{t'}) \approx \frac{1 + G'(t, m_t)}{\frac{8 \cdot Data_n}{D_{moy_n}(t, m_t)} - t_{tra_n m_{t'}}} \quad (24)$$

assuming that the occupation of the channel due to the services other than the service n remains unchanged at time t' compared to what it was at time t.

By combining equations (8), (20), and (21), the mean access time $$t_{acc_n m_{t'}}$$

to the communication channel at instant t' for the frames of the service n that are to be transmitted may be estimated as follows:

$$t_{acc_n m_{t'}} \approx \frac{1 - (G' + \lambda_n(t', m_{t'}) \cdot t_{tra_n m_{t'}})}{\lambda' + \lambda_n(t', m_{t'})} \quad (25)$$

For a given service n, in order to select at instant t' a mode m from N modes, the method determines a metric value $\gamma_{nm_{t'}}$ for each mode m. This metric amounts to comparing an evaluation of the mean access time $$t_{tra_{nm_{t'}}}$$

to the communication channel at time t' with an evaluation of the time $$t_{acc_{nm_{t'}}}$$

needed at the time t' for transmitting a PPDU frame relating to the service n with this new mode m:

$$\gamma_{nm_{t'}} = 10 \cdot \log_{10}\left(\frac{t_{acc_{nm_{t'}}}}{t_{tra_{nm_{t'}}}}\right) \quad (26)$$

For a mode m, the time $$t_{acc_{nm_{t'}}}$$

needed for transmitting a frame PPDU is determined from equation (9) and the mean access time $$t_{acc_{nm_{t'}}}$$

is evaluated from equation (25) by replacing the time $$t_{tra_{nm_{t'}}}$$

by the value determined using equation (9) and replacing $\lambda_n(t',m_{t'})$ by the value determined using equation (24). Knowing the values of $$t_{tra_{nm_{t'}}}$$

and of $$t_{tra_{nm_{t'}}}$$

the method determines the metric $\gamma_{nm_{t'}}$.

The method compares the value of the metric $\gamma_{nm_{t'}}$ with a threshold of value $\gamma_{min}$ that can be deduced by simulations. If the metric $\gamma_{nm_{t'}}$ is below the threshold, then the mode m is eliminated from the selection of the link adaptation method.

The minimum value $\gamma_{min}$ of the threshold is zero, which corresponds to times $$t_{tra_{nm_{t'}}} \text{ and } t_{acc_{nm_{t'}}}$$

that are practically identical, with channel occupancy being at a maximum; there are no longer any "holes" between the frames that are transmitted. The condition $\gamma_{min}=0$ requires the mean access time to the channel for a service n to be equal to not less than the time for transmitting a frame of the service n.

Once the mode m for the station n has been selected, the occupancy G of the link and the overall arrival rate of frames $\lambda$ can be approximated by the following equations:

$$G \approx G' + G_{nm_{t'}} \quad (27)$$

$$\lambda \approx \lambda' + \lambda_n(t',m_{t'}) \quad (28)$$

In a first implementation of the invention, preselection is performed with the help of the metric $\gamma$ from among the various transmission modes $Mode_1, \ldots, Mode_M$ of the entity corresponding to a service n requested by a user of the entity. This preselection serves to determine which mode can be used for performing transmission while taking account of the state of the transmission channel. In other words, the preselection serves to put aside modes that cannot enable PPDU frames to be transmitted while guaranteeing a mean data rate $D_{moy}$, a quality of service QoS, and optimum occupation of the channel.

If a plurality of transmission modes are available after this preselection, selection is performed on the preselected modes by using another metric.

Figure 5:
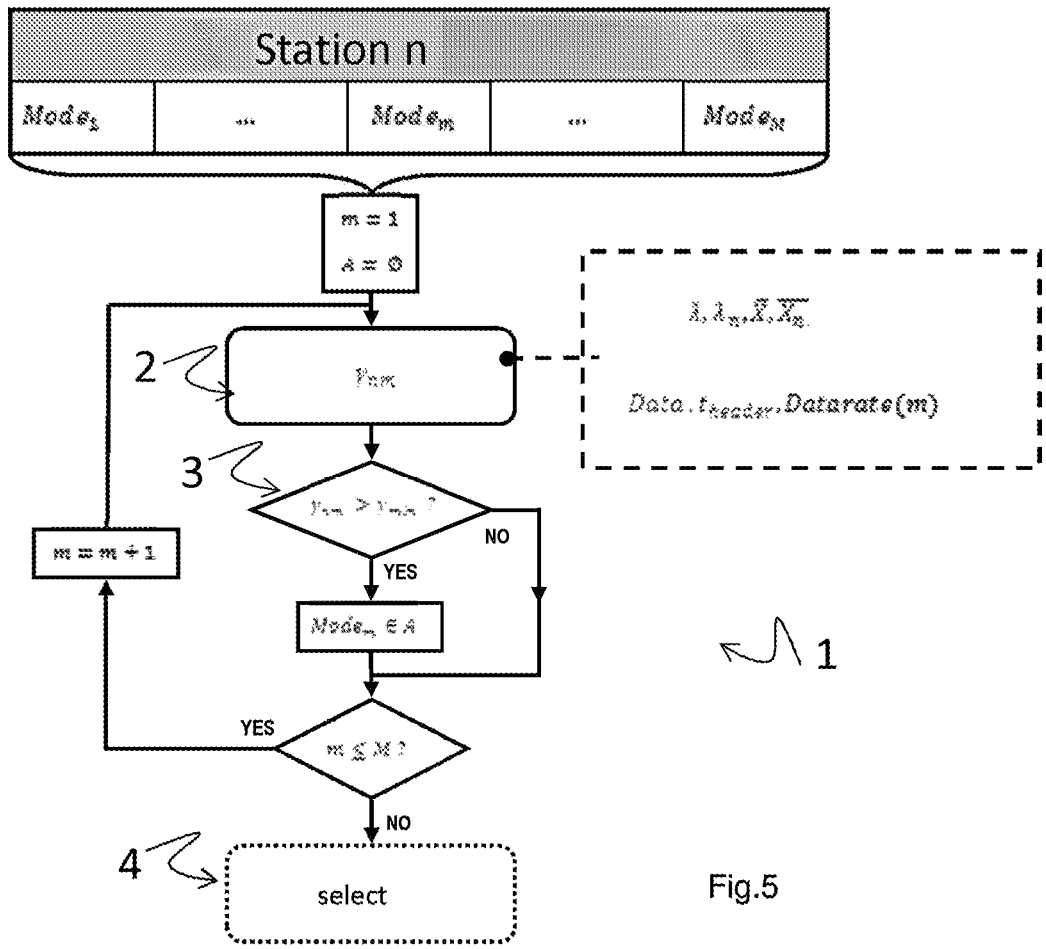
FIG. 5 is a flow chart of the main steps for performing a first implementation of the method of the invention.

FIG. 5 is a flow chart of the main steps of performing the method in a first implementation of the invention in a single technology context, i.e. all of the modes considered belong to a single given transmission interface.

In the mode described, the access point has various transmission modes that are associated with respective different instantaneous data rates and that perform the method 1 of the invention. In the mode shown, a mode counter is initialized at one, m=1, and the set A of preselected modes is initialized as an empty set.

In a first step 2, the method calculates the metric $\gamma_{n,m}$ for the service n and the mode m over an observation window $t_{OBS}$.

In a second step 3, the method compares the metric $\gamma_{n,m}$ with a threshold value $\gamma_{n,m}$: $\gamma_{n,m} > \gamma_{n,m}$?

If the metric is strictly greater than the threshold, then the mode m is preselected, i.e. the mode $Mode_m$ belongs to the set A: $Mode_m \in A$, and the method then performs a test to determine whether the value of the counter is less than M: m≤M?, i.e. whether any more modes remain.

Else, the method performs the test.

If during the test the value of the counter is less than M, then the counter is incremented by one, m=m+1, and the method loops back to the first step.

Else, during a third step 4, the method then makes a selection using a determined criterion in order to select one of the transmission modes from the various preselected modes that belong to the set A.

This selection may be performed, by way of example, by implementing a known link adaptation algorithm.

Figure 6:
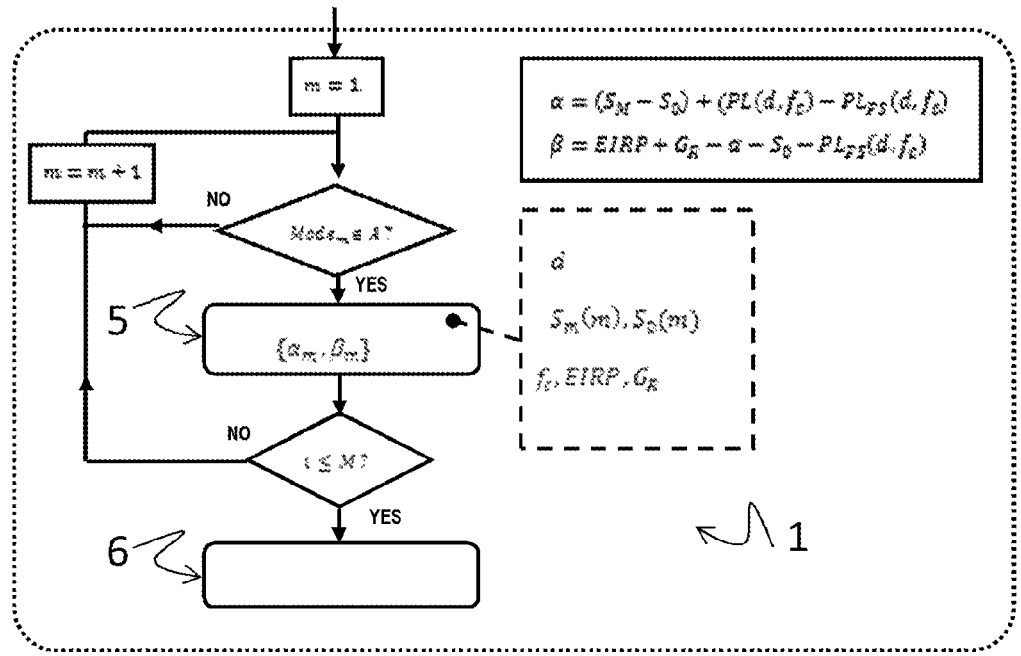
FIG. 6 is a flow chart showing how the step of selecting an interface and a transmission mode of FIG. 5 takes place in a first implementation of the method that uses a GLB link adaptation algorithm, i.e. in a multi-technology interface context.

In a first implementation shown in FIG. 6, the link adaptation algorithm makes use of the green link budget (GLB) metric $\{\alpha,\beta\}$ constituted by two parameters $\alpha$ and $\beta$ using the method described in patent application WO 2011/083238 published on Jul. 14, 2011. FIG. 6 shows only the third step of FIG. 5.

This mode is particularly suitable when the transmission modes are associated with different transmission interfaces. This GLB {α,β} metric serves to select the transmission interface and the transmission mode that makes it possible to minimize the transmission power while complying with an instantaneous data rate constraint, a QoS constraint, and an emitter-receiver distance. It is constituted by two parameters α and β.

The parameter α serves to select the transmission Interface and the transmission mode subjected to the least multi-path degradation in the physical layer. It is the sum of two sub-parameters:

$$\alpha = MCM + PLM$$

where MCM is the multi-path channel margin that corresponds to the power difference required between the ideal circumstances and realistic transmission circumstances:

$$MCM = SNR_c - SNR_c^{AWGN}$$

$$MCM = S_m - S_0$$

where $SNR_c$ and $SNR_c^{AWGN}$ are respectively the signal-to-noise ratios (SNRs) required in the realistic situation and in the ideal situation (AWGN channel). $S_m$ and $S_0$ are the respective powers required in the realistic situation and in the ideal situation (AWGN channel).

Where PLM is the relative propagation attenuation that corresponds to the difference of losses due to propagation between the ideal situation and the realistic transmission situation:

$$PLM = PL(d, f_c) - PL_{FS}(d, f_c)$$

$$PLM = 10 \cdot n \cdot \log_{10}\left(\frac{d}{d_0}\right) - 10 \cdot \log_{10}\left(\frac{d}{d_0}\right)^2 + \sigma$$

$$PLM = 10 \cdot \log_{10}\left(\frac{d}{d_0}\right)^{n-2} + \sigma$$

where PL(d) represents propagation losses in the realistic situation (multiple paths), $PL_{FS}(d)$ represents propagation losses in ideal circumstances (free space), $\underline{d}$ is the distance to the target, $f_c$ is the carrier frequency, $d_0$ is the reference distance, $\underline{n}$ characterizes the multi-path channel, and corresponds to the exponential decrease due to distance, and σ corresponds to masking effects.

In step 5, the method calculates the metric α using the equation:

$$\alpha = (S_M - S_0) + (PL(d, f_c) - PL_{FS}(d, f_c)).$$

The parameter β corresponds to the difference between the power available and the power required for ensuring a QoS (i.e. a target BER evaluated over the MSDU data field) with an emitter-receiver distance $\underline{d}$. This parameter makes it possible to adjust the transmission power of the selected transmission mode interface in order to reduce the power that is radiated and in order to control power dynamically.

$$\beta = ARP(d, f_c) - S_M$$

The mean receive power ARP(d) is expressed as follows:

$$ARP(d, f_c) = EIRP + G_R PL(d, f_c)$$

where EIRP is the equivalent isotropic radiated power from the emitter, and $G_R$ is the gain of the receive antenna.

The method calculates in step 5 the metric β which is expressed using the following equation:

$$\beta = EIRP + G_R - \alpha - S_0 - PL_{FS}(d, f_c) \qquad (30)$$

Thus, the GLB {α,β} algorithm performs a selection in step 6 to select a transmission mode in a multimode terminal by optimizing the normalized link budget that makes it possible to compare systems operating in different bands (RF, optical, wired) and that present independent power variation ranges. The metric α evaluates the overall relative degradation introduced by the multi-path channel on the transmission device and in the propagation medium. The metric μ measures the power excess between the power available $ARP(d, f_c)$ and the power required $S_M$ for providing communication with a given QoS. Both of these metrics are measured in decibels (dB).

Figure 7:
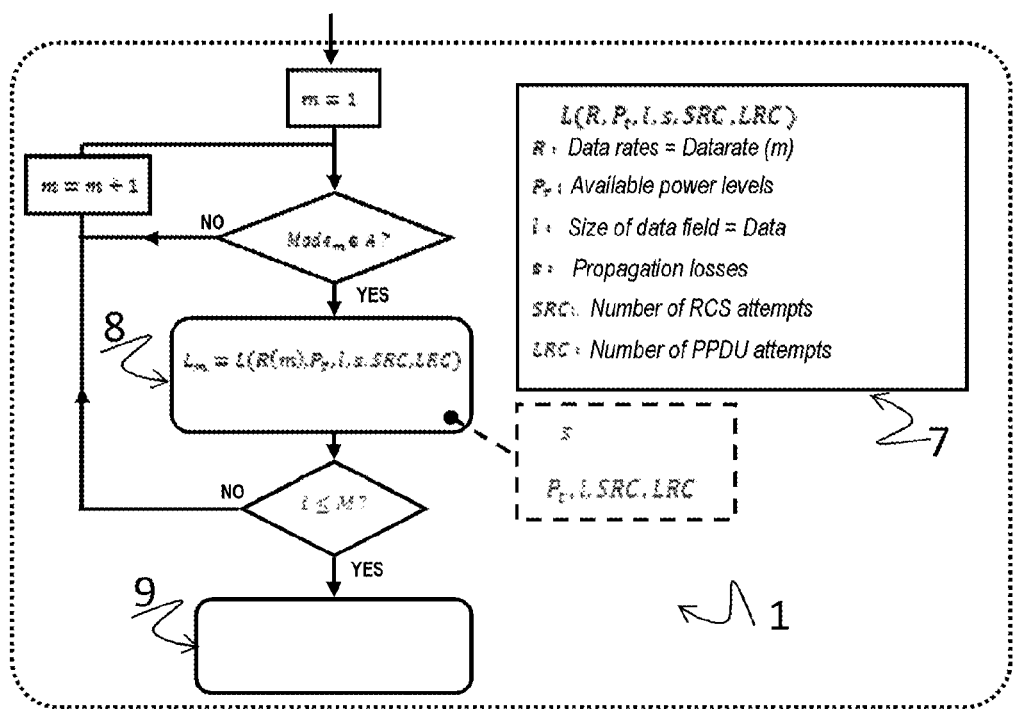
FIG. 7 is a flow chart showing how the correction step of FIG. 5 takes place in a second implementation of the method that uses a MiSer link adaptation algorithm.

In a second implementation shown in FIG. 7, the link adaptation algorithm is an algorithm of the MiSer type. FIG. 7 shows only the third step of FIG. 5. The MiSer algorithm comprises an initialization stage 7 during which quality tables are calculated and it also comprises a real time execution stage.

During the initialization stage 7, the method estimates two parameters:

$L(R, P_T, l, s, SRC, LRC)$: the number of bits that will be transmitted correctly; and $E(R, P_T, l, s, SRC, LRC)$: the energy needed to transmit L.

These two estimates are calculated recursively by considering all possible combinations of the parameters R, $P_T$, l, s, SRC, and LRC.

Thereafter, from the estimates of the parameters, the method estimates the energy efficiency J in application of equation (1) during the real time execution stage, by considering the following six parameters: R, $P_T$, l, s, SRC, and LRC. The station that seeks to transmit a load £ estimates in step 8 the propagation losses $\underline{s}$ and recovers the number of attempts at transmitting the RTS (SRC) and at transmitting the PPDU (LRC). As a function of the data quadruplet (l, s, SRC, LRC), the station retrieves from the tables that were calculated while it was not in operation, the combination of parameters $(R, P_T)$ that is to be used in order to maximize the energy efficiency of the transmission. For each of the possible combinations (l, s, SRC, LRC), the combination $(R, P_T)$ that minimizes J is stored.

In step 9, the method selects the mode $\underline{m}$ that maximizes the energy efficiency of transmission.

This algorithm thus makes it possible to maximize the efficiency of transmitting a load of data but it is quite constraining since it requires use to be made of RTS/CTS (thereby increasing the consumption of the system since emitting RTS/CTS frames has an energy cost). Furthermore, it is necessary while not in operation to calculate the energy efficiencies that correspond to all possible combinations of the parameters $(R, P_T, l, s, SRC, LRC)$.

Using RTS/CTS frames makes it possible to reduce the number of collisions due to the hidden station problem, but it encumbers the channel (for each PSDU that is to be transmitted, it is necessary beforehand to emit an RTS and to receive a CTS). This type of MiSer algorithm advantageously combines optimizing the modulation and coding scheme (MCS) with managing the transmission power.

In a variant, the MiSer algorithm is adapted to be performed without activating the RTS/CTS mechanism. In this adaptation, the algorithm estimates the energy efficiency using the following equation:

$$\eta_{nm}^p = \frac{L_{nm}: \text{quantity of bits transmitted successfully}}{E_{nm}: \text{energy expended for transmission}} \quad (31)$$

For this purpose, the method estimates the following parameters:

$$L_{nm} = P_S(G_{nm}) \cdot 8 \cdot \text{Data}_n$$

$$E_{nm} = t_{tra_{nm}} \cdot P_{T_{nm}} \quad (32)$$

where $P_{T_{nm}}$ is the power needed on emitting to address each of the stations with the desired quality of service, e.g. with a BER=$10^{-5}$ (with a safety margin of 3 dB). This power is expressed in the following form:

$$P_{T_{nm}} = \text{EIRP} + G_R - \beta_{nm} + 3 \text{ dB} \quad (33)$$

where EIRP is the equivalent isotropic radiated power of the emitter, and $G_R$ is the gain of the receive antenna.

The method estimates the energy efficiency at instant $t$ for a service $n$:

$$\eta_{nm_t} = \frac{8 \cdot \text{Data}_n}{(1 + G' + \lambda_n(t, m_t)t_{tra_{nm}}) \cdot t_{tra_{nm_t}} \cdot P_{T_n}} \quad (34)$$

In order to determine the mode $m_{t'}$ that is to be selected at instant $t'$ for the service $n$, the method estimates the forecast energy efficiency at that instant $t'$:

$$\eta_{nm_t} = \frac{8 \cdot \text{Data}_n}{(1 + G' + \lambda_n(t', m_t)t_{tra_{nm_{t'}}}) \cdot t_{tra_{nm_{t'}}} \cdot P_{T_n}} \quad (35)$$

Selection using the adaptive MiSer algorithm consists in selecting the mode that optimizes $\eta_{nm_{t'}}$.

Figure 8:
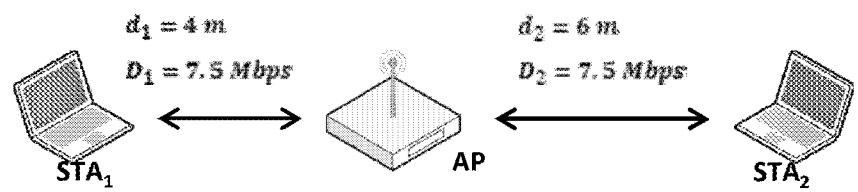
FIG. 8 is a diagram of a single technology implementation of the invention with a WiFi type communication system having an access point AP and two stations $STA_1$ and $STA_2$.

FIG. 8 shows an implementation in a context of adapting a single technology link. In this example, the WiFi type communication system has an access point AP and two stations $STA_1$, $STA_2$.

The station $STA_1$ is spaced apart from the access point AP by a distance $d_1$=4 meters (m) and it seeks to set up communication with the AP at a mean data rate $D_1$=7.5 megabits per second (Mbps). The station $STA_2$ is spaced apart from the access point AP by a distance $d_2$=6 m and it seeks to set up communication with the AP at a mean data rate $D_2$=7.5 Mbps. Power control is performed so that each transmission takes place with the minimum required power. The two stations have the following parameters:
  carrier frequency: $f_c$=5 GHz;
  transmission bandwidth: B=40 megahertz (MHz);
  number of spatial streams per station: $N_{SS}$=2;
  maximum radiated power: EIRP=23 dBm;
  antenna receive gain: $G_R$=0 dB;
  mean payload of PSDUs: data=8000 bytes;
  duration of headers: $t_{header}$=20 µs.

The method of accessing the channel is of the CSMA/CA type and the access point estimates the following parameters at instant $t$: $\lambda$, $\lambda_n$, X, $\overline{X_n}$. The access point and each of the stations has only one transmission interface of 802.11 type and has the following ten transmission modes:

| m | 1 | 2 | 3 | 4 | 5 | 6 | 7 | 8 | 9 | 10 |
|---|---|---|---|---|---|---|---|---|---|---|
| MIMO | | | SDM | | | | | STBC | | |
| MCS | QPSK ½ | QPSK ¾ | 16-QAM ½ | 16-QAM ¾ | 64-QAM ⅔ | QPSK ½ | QPSK ¾ | 16-QAM ½ | 16-QAM ¾ | 64-QAM ⅔ |

The associated instantaneous data rates $D_m$ are as follows:

| m | 1 | 2 | 3 | 4 | 5 | 6 | 7 | 8 | 9 | 10 |
|---|---|---|---|---|---|---|---|---|---|---|
| $D_m$ (Mbps) | 54 | 81 | 108 | 162 | 216 | 27 | 40.5 | 54 | 81 | 108 |

At time t=0, the AP uses mode 6 to deliver a mean data rate $D_1$=7.5 Mbps to the station $STA_1$. Link occupancy is then G=38.96%, $\lambda_1$=163 frames/s.

In compliance with the description of an implementation of the method of the invention as shown in FIG. 5, the time $t_{tra_{nm}}$ is determined from equation (9) for each of the modes and for the service 2 associated with the station 2:

| m | 1 | 2 | 3 | 4 | 5 | 6 | 7 | 8 | 9 | 10 |
|---|---|---|---|---|---|---|---|---|---|---|
| $t_{tra_{2m}}$ | 1.21 | 0.81 | 0.61 | 0.42 | 0.32 | 2.39 | 1.60 | 1.21 | 0.81 | 0.61 |

The method evaluates the time $t_{acc_{2m}}$ and calculates the metric $\gamma_{2m}$ with the constraint of guaranteeing the data rate $D_2$=75 Mbps to the station $STA_2$:

| m | 1 | 2 | 3 | 4 | 5 | 6 | 7 | 8 | 9 | 10 |
|---|---|---|---|---|---|---|---|---|---|---|
| $t_{acc_{2m}}$ | 1.08 | 1.35 | 1.49 | 1.61 | 1.68 | 0.18 | 0.80 | 1.08 | 1.35 | 1.49 |
| $\gamma_{2m}$ | −0.47 | 2.23 | 3.85 | 5.90 | 7.24 | −11.26 | −3.03 | −0.47 | 2.23 | 3.85 |

The metric $\gamma_{2m}$ makes it possible to eliminate the modes 1, 6, 7, and 8 from the selection since the values obtained for this metric are below the minimum threshold $\gamma_{min}$=0.

Selection is then performed using a link adaptation algorithm.

Figure 9:
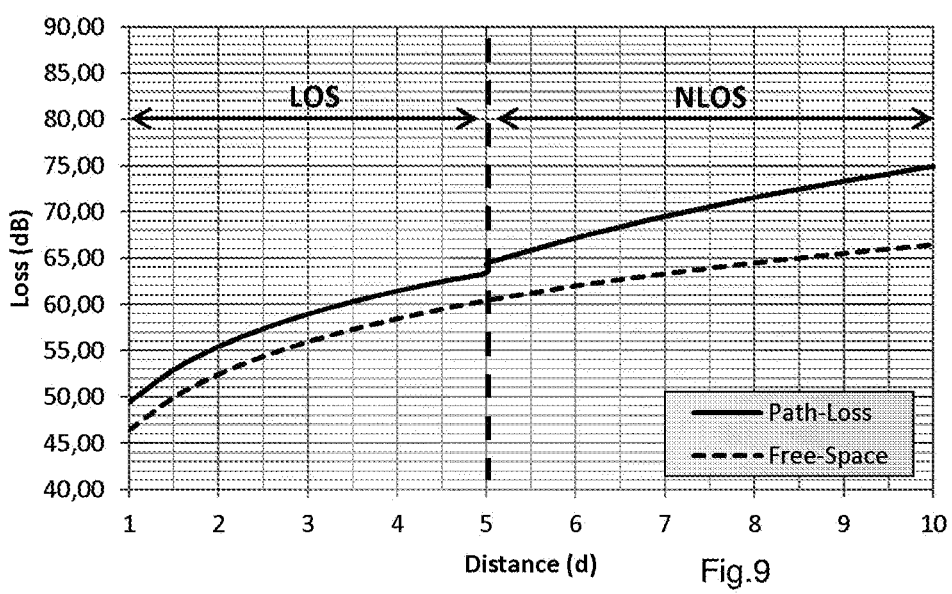
FIG. 9 shows the attenuation of the propagation channel at 5 gigahertz (GHz).

In a first implementation, the method of the invention performs a GLB algorithm in compliance with the implementation described with reference to FIG. 6. The parameters $S_m$ and $S_0$ are given in [4] by considering a propagation channel of TGn model B type. The parameters PLd, 5 GHz) and $PL_{fs}(D, 5\text{ GHz})$ are shown in FIG. 9 showing propagation loss models. The method calculates:

| m | 1 | 2 | 3 | 4 | 5 | 6 | 7 | 8 | 9 | 10 |
|---|---|---|---|---|---|---|---|---|---|---|
| $\alpha_{2m}$ | 15.08 | 18.12 | 17.12 | 17.76 | 19.11 | 7.08 | 8.12 | 8.12 | 7.16 | 8.61 |
| $\beta_{2m}$ | 21.78 | 16.78 | 14.78 | 10.18 | 4.78 | 29.78 | 26.78 | 23.78 | 20.78 | 15.28 |

The metric α leads to selecting mode 9. Thus, the method of the invention is advantageous since it makes it possible to improve the efficiency of the GLB algorithm. The GLB algorithm would lead to selecting mode 6. In the invention, the load on the channel is evaluated by means of the metric $\gamma_{2m}$. The method of the invention makes it possible to avoid overloading the channel by eliminating selection of mode 6 which would lead to the channel being overloaded.

In a second implementation, the method of the invention performs a MiSer algorithm adapted in compliance with the implementation described with reference to FIG. 7.

Using equation (34), the method initially calculates $\eta_1=171.13$ Gbit/J. Using equation (35) the method then calculates:

| m | 1 | 2 | 3 | 4 | 5 | 6 | 7 | 8 | 9 | 10 |
|---|---|---|---|---|---|---|---|---|---|---|
| $\eta_{2m_t}$ | 12.41 | 6.15 | 5.27 | 2.76 | 1.06 | 33.10 | 27.97 | 19.67 | 15.46 | 5.91 |

Determining the energy efficiency $\eta_{2m_t}$ then leads to selecting mode 9. Thus, the method of the invention is advantageous since it makes it possible to improve the efficiency of the adapted MiSer algorithm. The adapted MiSer algorithm would lead to selecting mode 6. With the invention, the load on the channel is evaluated by means of the metric $\gamma_{2m}$. The method of the invention makes it possible to avoid overloading the channel by eliminating selection of mode 6 which leads to the channel being overloaded.

Figure 10:
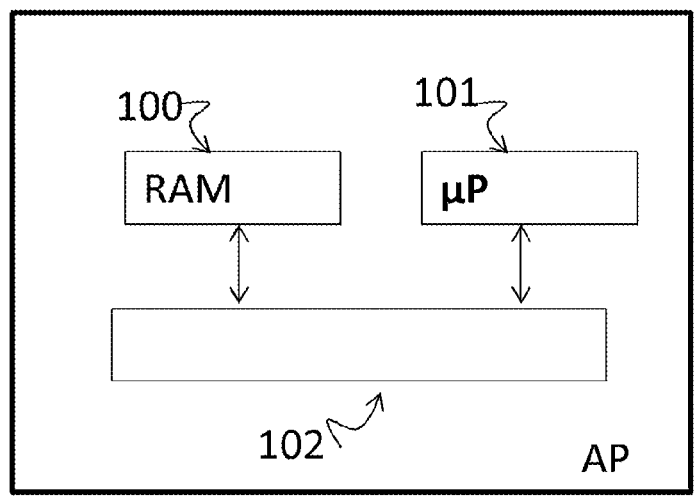
FIG. 10 is a simplified diagram showing the structure of an access point of the invention.

The simplified structure of an access point performing a link adaptation method of the invention is described with reference to FIG. 10.

Such an access point AP comprises a memory module 100 having a buffer random access memory (RAM), a processor unit 101, e.g. having a microprocessor µP that is controlled by the computer program 102 that performs the link adaptation method of the invention.

On initialization, the code instructions of the computer program 62 are loaded by way of example into the RAM prior to being executed by the processor of the processor unit 61. The processor unit 61 receives as input the data transmitted over the channel. The microprocessor of the processor unit 61 performs the steps of the above-described link adaptation method in compliance with the instructions of the computer program 62 in order to determine the time occupancy metric γ of the channel.

For this purpose, the access point comprises:

M transmission modes associated respectively with different instantaneous data rates;

a determination module for determining the value of a first time occupancy metric $\gamma_{n,m}$ of the channel for a given transmission mode;

a comparator module for comparing the values of the metric $\gamma_{n,m}$ for different modes with a threshold value in order to preselect transmission modes; and a link adaptation module for making a selection in application of a determined criterion from among the various modes that have been preselected.

While the processor of the processor unit 61 is executing the code instructions of the computer program 62:

the processor initializes a mode counter at one and a variable containing the set A of preselected modes to an empty set;

the determination module calculates the metric $\gamma_{n,m}$ for the service n and for the mode m over an observation window $t_{OBS}$;

the processor compares the metric $\gamma_{n,m}$ with a threshold value for $\gamma_{n,m}$: $\gamma_{n,m} > \gamma_{n,m}$? If the metric is strictly greater than the threshold, then the mode m is preselected, i.e. the mode $\text{Mode}_m$ is stored in the variable containing the set A: $\text{Mode}_m \in A$. The processor compares the value of the counter with M: m≤M?, i.e. it determines whether there remain any more modes. If the value of the counter is less than M during the test, then the mode counter is incremented by one, m=m+1; and the link adaptation module makes its selection in application of a determined criterion from among the various preselected modes that belong to the set A once the value of the counter becomes strictly greater than M.

TABLE 20-35

MCS parameters for optional 40 MHz, NSS = 2, NES = 1

| MCS Index | Modulation | R | $N_{BPSCS}(i_{SS})$ | $N_{SD}$ | $N_{SP}$ | $N_{CBPS}$ | $N_{DSPS}$ | Data rate (Mb/s) 800 ns GI | 400 ns GI |
|---|---|---|---|---|---|---|---|---|---|
| 8 | BPSK | ½ | 1 | 108 | 6 | 216 | 108 | 27.0 | 30.0 |
| 9 | QPSK | ½ | 2 | 108 | 6 | 432 | 216 | 54.0 | 60.0 |
| 10 | QPSK | ¾ | 2 | 108 | 6 | 432 | 324 | 81.0 | 90.0 |
| 11 | 16-QAM | ½ | 4 | 108 | 6 | 864 | 432 | 108.0 | 120.0 |

TABLE 20-35-continued

MCS parameters for optional 40 MHz, NSS = 2, NES = 1

| MCS Index | Modulation | R | $N_{BPSCS}(i_{SS})$ | $N_{SD}$ | $N_{SP}$ | $N_{CBPS}$ | $N_{DSPS}$ | Data rate (Mb/s) 800 ns GI | 400 ns GI |
|---|---|---|---|---|---|---|---|---|---|
| 12 | 16-QAM | ¾ | 4 | 108 | 6 | 864 | 648 | 162.0 | 180.0 |
| 13 | 64-QAM | ⅔ | 6 | 108 | 6 | 1296 | 864 | 216.0 | 240.0 |
| 14 | 64-QAM | ¾ | 6 | 108 | 6 | 1296 | 972 | 243.0 | 270.0 |
| 15 | 64-QAM | ⅚ | 6 | 108 | 6 | 1296 | 1080 | 270.0 | 300.0 |

REFERENCES

[1] Daji Qiao, Sunghyun Choi, Amit Jain, and Kan G. Shin, "MiSer: An Optimal Low-Energy Transmission Strategy for IEEE 802.11a/h," MobiCom '03, pp. 161-175, September 2003.
[2] IEEE Computer Society, "Wireless LAN Medium Access Control (MAC) and Physical Layer (PHY) Specifications," IEEE Std 802.11™-2012, 2012
[3] Chapter 16, Section 5, pp. 1068-1077, John G. Proakis and Masoud Salehi, Digital. Communications, 5th ed., publisher McGraw-Hill International, 2008.
[4] V. Erceg et al., "TGn Channel Models," IEEE P802.11 Wireless LANs, 2007.

Although the present disclosure has been described with reference to one or more examples, workers skilled in the art will recognize that changes may be made in form and detail without departing from the scope of the disclosure and/or the appended claims.

The invention claimed is:

1. A link adaptation method comprising:
using a selection criterion for selecting a transmission mode for transmitting physical layer protocol data unit (PPDU) frames to be transmitted over a channel of a telecommunications system having an access point and at least one station possessing various transmission modes associated with different instantaneous bit rates, access to the channel being of the random type, wherein selecting a transmission mode makes use of a time occupancy metric γ for the channel that is expressed in the following form:

$$\gamma = 10 \cdot \log_{10}\left(\frac{t_{acc}}{t_{tra_m}}\right)$$

with $t_{acc}$ being the mean access time to the channel over the observation window, $t_{tra_m}$ being the time needed to transit a PPDU frame using the transmission mode $\underline{m}$, and being expressed in the following form:

$$t_{tra_m} = t_{header} + \frac{Data}{Datarate(m)}W$$

with Data being the load in bytes of a physical layer service data unit (PSDU) for transmitting in the PPDU frame, and Datarate being the instantaneous data rate corresponding to the transmission mode $\underline{m}$ being used.

2. The link adaptation method according to claim 1, wherein the time determination for determining the mean access time to the channel $t_{acc}$ is performed from a transmission mean data rate.

3. The link adaptation method according to claim 2, wherein the mean data rate is expressed as a function of the probability of successfully transmitting the PPDU frames associated with a service $\underline{n}$, said probability of success $P_s(G)$ being estimated as follows:

$$P_s(G) \approx \frac{1}{1+G}$$

with G being the occupancy rate of the link.

4. The link adaptation method according to claim 1 comprising:
comparing a threshold value with the values of the metric γ as determined for different transmission modes in order to preselect modes; and
selecting in compliance with a determined criterion of one mode from among the various preselected modes.

5. The link adaptation method according to claim 1, wherein occupancy of the channel is measured over a determined observation window and makes use of a Poisson distribution model for the arrival rates of the PPDU frames to be transmitted, the variance λ of the Poisson distribution corresponding to the mean frequency of arrival of the PPDU frames.

6. The link adaptation method according to claim 1, wherein the various transmission modes are classified by groups of equivalent data rates D, and for a group, the method comprises:
determining the value of a first metric α for a given transmission mode, which metric measures relative degradation of the communication signal at a given distance $\underline{d}$ as introduced by the transmission medium for a given environment relative to a reference model of the transmission medium, resulting from a multi-path effect and/or an attenuation effect of the transmission medium; and
comparing values of the first metric α for different modes for selection with at least one transmission mode (Mode$_i$) per group.

7. A WiFi access point comprising:
M transmission modes that are associated with respective different instantaneous data rates, M≥2, for a telecommunications system having a plurality of stations and the access point, access to the transmission channel of the WiFi telecommunications system being of the random type;
a non-transitory computer-readable medium comprising instructions stored thereon;
a processor configured by the instructions to perform acts comprising:
determining the value of a first time occupancy metric $\gamma_{n,m}$ of the channel for a given transmission mode, which metric is expressed in the following form:

$$\gamma = 10 \cdot \log_{10}\left(\frac{t_{acc}}{t_{tra_m}}\right)$$

with $t_{acc}$ being the mean access time to the channel over the observation window, $t_{tra_m}$ being the time needed for transmitting a physical layer protocol data unit (PPDU) frame using transmission mode $\underline{m}$, which time is expressed in the following form:

$$t_{tra_m} = t_{header} + \frac{Data}{Datarate(m)}$$

with Data being the load in bytes of a physical layer service data unit (PSDU) to be transmitted in the PPDU frame, Datarate being the instantaneous data rate corresponding to the transmission mode $\underline{m}$ in use;
comparing the values of the metric $\gamma_{n,m}$ for different modes with a threshold value in order to preselect transmission modes; and
making a selection in compliance with a determined criterion from among the various preselected modes.

8. A telecommunications system including a WiFi access point according to claim 7.

9. A non-transitory computer-readable data medium including program instructions adapted to perform a link adaptation method, when said program is loaded and executed in a WiFi access point the link adaptation method comprising:
using a selection criterion for selecting a transmission mode for transmitting physical layer protocol data unit (PPDU) frames to be transmitted over a channel of a telecommunications system having an access point and at least one station possessing various transmission modes associated with different instantaneous bit rates, access to the channel being of the random type, wherein selecting a transmission mode makes use of a time occupancy metric γ for the channel that is expressed in the following form:

$$\gamma = 10 \cdot \log_{10}\left(\frac{t_{acc}}{t_{tra_m}}\right)$$

with $t_{acc}$ being the mean access time to the channel over the observation window, $t_{tra_m}$ being the time needed to transit a PPDU frame using the transmission mode $\underline{m}$, and being expressed in the following form:

$$t_{tra_m} = t_{header} + \frac{Data}{Datarate(m)}\underline{W}$$

with Data being the load in bytes of a physical layer service data unit (PSDU) for transmitting in the PPDU frame, and Datarate being the instantaneous data rate corresponding to the transmission mode $\underline{m}$ being used.

\* \* \* \* \*